(12) United States Patent
Savir et al.

(10) Patent No.: US 10,853,489 B2
(45) Date of Patent: Dec. 1, 2020

(54) DATA-DRIVEN IDENTIFICATION OF MALICIOUS FILES USING MACHINE LEARNING AND AN ENSEMBLE OF MALWARE DETECTION PROCEDURES

(71) Applicant: EMC IP Holding Company LLC, Hopkinton, MA (US)

(72) Inventors: Amihai Savir, Sansana (IL); Omer Sagi, Mazkeret Batya (IL); Or Herman Saffar, Beer Sheva (IL); Raul Shnier, Kibbutz Ruhama (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 16/165,051

(22) Filed: Oct. 19, 2018

(65) Prior Publication Data
US 2020/0125728 A1 Apr. 23, 2020

(51) Int. Cl.
*H04L 29/06* (2006.01)
*G06F 21/56* (2013.01)
*G06F 21/55* (2013.01)
*G06N 7/00* (2006.01)
*G06N 20/00* (2019.01)

(52) U.S. Cl.
CPC .......... *G06F 21/565* (2013.01); *G06F 21/554* (2013.01); *G06N 7/005* (2013.01); *G06N 20/00* (2019.01); *G06F 21/568* (2013.01); *G06F 2221/033* (2013.01)

(58) Field of Classification Search
CPC .... G06F 21/565; G06F 21/568; G06F 21/554; G06F 21/56; G06F 21/577; G06N 20/00; G06N 7/005; H04L 63/1416; H04L 63/145
See application file for complete search history.

(56) References Cited

U.S. PATENT DOCUMENTS

| 8,181,251 | B2* | 5/2012 | Kennedy | H04L 63/145 726/23 |
| 8,806,641 | B1* | 8/2014 | Li | G06F 21/564 717/174 |
| 8,978,137 | B2* | 3/2015 | Friedrichs | G06F 21/56 726/23 |
| 9,294,486 | B1* | 3/2016 | Chiang | H04L 63/14 |

(Continued)

OTHER PUBLICATIONS

U.S. Appl. No. 15/963,413 entitled, "Data-Driven Scheduling of Automated Software Program Test Suites", filed Apr. 26, 2018.

(Continued)

*Primary Examiner* — Hosuk Song
(74) *Attorney, Agent, or Firm* — Ryan, Mason & Lewis, LLP (57) ABSTRACT

Techniques are provided for data-driven ensemble-based malware detection. An exemplary method comprises obtaining a file; extracting metadata from the file; obtaining a plurality of malware detection procedures; selecting a subset of the plurality of malware detection procedures to apply to the file utilizing a likelihood that each of the plurality of malware detection procedures will result in a malware detection for the file based on the extracted metadata; applying the selected subset of the malware detection procedures to the file; and processing results of the subset of malware detection procedures using a machine learning model to determine a probability of the file being malware.

20 Claims, 6 Drawing Sheets

(56) References Cited

U.S. PATENT DOCUMENTS

| | | | | |
|---|---|---|---|---|
| 9,350,747 B2* | 5/2016 | McLarnon | ............... | H04L 63/14 |
| 9,386,034 B2* | 7/2016 | Cochenour | ......... | G06F 21/6218 |
| 2011/0041179 A1* | 2/2011 | Ståhlberg | .............. | G06F 21/566 |
| | | | | 726/23 |
| 2016/0328562 A1* | 11/2016 | Saxena | ................... | G06F 21/56 |

OTHER PUBLICATIONS

"How It Works—Virus Total", downloaded from https://support.virustotal.com/hc/en-us/articles/115002126889 on Oct. 11, 2018.

"VirSCAN.org" Free Multi-Engine Online Virus Scanner v1.02, Supports 41 Antivirus Engines! downloaded from http://www.viruscan.org/language/en/ on Oct. 11, 2018.

* cited by examiner

DATA-DRIVEN IDENTIFICATION OF MALICIOUS FILES USING MACHINE LEARNING AND AN ENSEMBLE OF MALWARE DETECTION PROCEDURES

FIELD

The field relates generally to information processing systems.

BACKGROUND

Malicious software or "malware" is any software used to interfere with computer system operations, gain unauthorized access to computer systems, acquire private or otherwise sensitive information, display unwanted advertising, or conduct any other harmful activities. Malware can take the form of executable code, scripts, active content, and other software.

A computer network typically incorporates malware detection procedures and other security functionality to protect the computers and other devices of the network against malware and other malicious activity. Malware authors and threat intelligence researchers are constantly in a repeated cycle of obfuscation and detection, respectively.

A malware detection ensemble is a collection of malware detection procedures used to determine whether a given file is malware. A given file is usually considered to be malware if one or more of the malware detection procedures included in the malware detection ensemble identifies the given file as being malware. It is often desirable to classify a given input file as malware as soon as possible, using as few malware detection procedures as possible.

A need therefore exists for techniques for predicting which malware detection procedures of a given malware detection ensemble are more likely to result in a malware detection for the given file.

SUMMARY

In one embodiment, a method comprises obtaining a file; extracting metadata from the file; obtaining a plurality of malware detection procedures; selecting a subset of the plurality of malware detection procedures to apply to the file utilizing a likelihood that each of the plurality of malware detection procedures will result in a malware detection for the file based on the extracted metadata; applying the selected subset of the malware detection procedures to the file; and processing results of the subset of malware detection procedures using a machine learning model to determine a probability of the file being malware.

In some embodiments, the step of selecting the subset of the malware detection procedures to apply to the file employs a Bayesian model that determines a probability that a given malware detection procedure will detect malware in the given file based on one or more historical executions of the given malware detection procedure and characteristics of historical files on which the given malware detection procedure was previously executed.

In at least one embodiment, the step of processing the results of the subset of the malware detection procedures using the machine learning model employs a supervised machine learning model that processes the results of the subset of the malware detection procedures as an input and models relationships within the results to generate a health score indicating whether the file is malware.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for data-driven ensemble-based malware detection.

In one or more embodiments, data-driven ensemble-based malware detection techniques are provided that employ an automatic approach to select a subset of malware detection procedures from among the available malware detection procedures, and for aggregating the results from the multiple selected malware detection procedures into a single decision. Generally, the disclosed techniques for selecting the malware detection procedures, in some embodiments, is based on a reasonable likelihood that a selected malware detection procedure will detect malware in a given input file. For example, the selective execution of each available malware detection procedure can be implemented by applying a Bayesian model (as opposed to existing approaches that strive to add additional layers of protection) that determines a malware detection probability for each available malware detection procedure.

Organizations invest significant resources to detect and prevent malicious files (often referred to as malware) from executing within their environment. Attackers often employ targeted attacks that are tailor-made, never-before-seen malware. In addition, attackers aim to develop new malware strains faster than computer security vendors can develop corresponding detection signatures.

Computer security vendors are thus adding multiple malware detection procedures in order to increase the coverage of their detection systems. These detection procedures are usually managed by a workflow engine that executes each malware detection procedure and a malware detection hub that provides a unified verdict based on the results of the different detection procedures. For example, VirusTotal™ is a computer security product available from Chronicle, a subsidiary of Alphabet Inc., that aggregates multiple anti-virus products and online scanning engines; and VirScan™ is a public domain online scanning service that utilizes multiple anti-virus programs to diagnose single files.

When using malware detection procedures, organizations need to delineate a strategy for executing and aggregating the results from the different malware detection procedures. In addition, organizations need to operate and maintain the chosen strategy. In the current state, companies run as many detection procedures as they have. The inevitable result is an inefficient system (in terms of execution time) and an unacceptable rate of false alarms due to overloaded detection procedures. In addition, cyber security experts spend most of their time refining the aggregation and execution approach, instead of investing their time on market analysis or in designing novel procedures and approaches.

In one or more embodiments, the present disclosure provides a data-driven identification of malicious files using machine learning and an ensemble of malware detection procedures. The disclosed malware identification techniques reduce the time required to detect malware in a given input file and/or reduce the proportion of false alarms, while substantially preserving the coverage of existing detection engines. The disclosed malware identification techniques use a Bayesian model that selects an ensemble of available malware detection procedures to run on a given input file based on the likelihood that each malware detection procedure will classify the input file as malware. After running the selected malware detection procedures, the respective results are applied to a machine learning model that provides the probability of the input file being malicious. This probability is optionally used by a separate alerting system, for example, configured by the user. In further variations, the probability is optionally used to perform one or more remedial actions on the input file, such as isolating the input file, removing the input file, applying a quarantine on the input file, limiting the permissions associated with the input file, analyzing the file in a sandbox environment and deleting the input file.

A high false alarm rate is a key problem for organizations that frequently run multiple malware detection procedures, often resulting in expensive time that is wasted on unnecessary investigations. A more severe effect of false alarms is that it may encourage a careless and easy approach in cases of true alerts. This is a common problem in the statistics domain: if multiple hypotheses are tested, the chance of a rare event increases, and therefore, the likelihood of a false alarm also increases. The inevitable conclusion is that organizations that run numerous investigation engines while considering the alert of each engine may suffer from a high rate of false alarms.

One approach taken by organizations is characterizing different combinations of malware detection tools and then using this characterization to decide whether a collection of results from the various malware detection tools is likely to be a malware. More specifically, an ad-hoc analysis is often conducted to identify important combinations of malware detection engines. This analysis is followed by the manual definition of rules where malware should be alerted to system operators. As the environment becomes complicated, it is necessary to expand and/or revise the alerting rules. The inevitable result is an increasing demand of cyber security experts that may deter organizations from using such approaches for the long run. In addition, this rule-based approach is not easily reproducible. The rules are required to be updated by cyber analysts whenever the observed reality changes. Since reality is constantly changing in the cyber security domain, as noted above, this malware detection approach may not keep pace with attackers and may eventually result in undetected malwares.

One or more embodiments of the disclosure provide for selection of a subset of a plurality of available malware detection procedures to apply to a given input file and for aggregation of the results of the selected subset of malware detection procedures. In some embodiments, statistical methods and machine learning algorithms are leveraged to improve the efficiency of the disclosed malware detection techniques and to reduce the usage of computational resources, as well as the number of associated false alarms.

Figure 1:
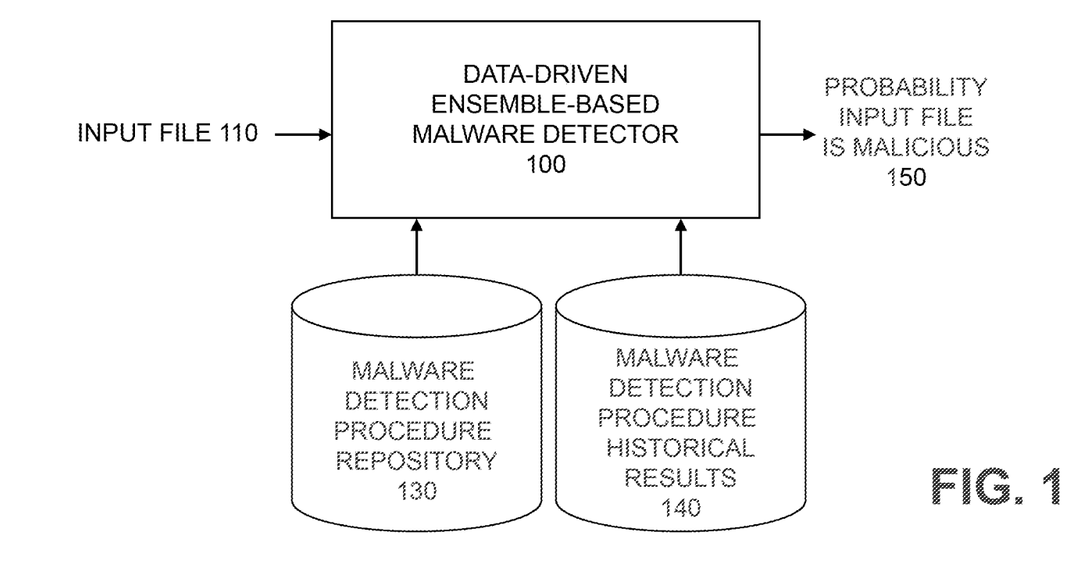
FIG. 1 illustrates an exemplary data-driven ensemble-based malware detector, according to an embodiment of the disclosure.

FIG. 1 illustrates an exemplary data-driven ensemble-based malware detector 100, according to an embodiment of the disclosure. As shown in FIG. 1, the exemplary data-driven ensemble-based malware detector 100 processes an input file 110 (e.g., of any file type) and determines a probability 150 that the input file 110 is a malicious file (or a benign file). Generally, the exemplary data-driven ensemble-based malware detector 100 selects an ensemble of malware detection procedures to apply to the input file 110 from among multiple available malware detection procedures in a repository 130, based on the probability that each available malware detection procedure will detect malware given characteristics of the input file 110 (e.g., metadata extracted from the input file 110). After running the selected malware detection procedures, the exemplary data-driven ensemble-based malware detector 100 applies a machine learning model to the results from the selected malware detection procedures to determine the probability 150 that the input file 110 is malicious. The machine learning model (not shown in FIG. 1) is trained using malware detection procedure historical results 140, as discussed further below in conjunction with FIG. 3.

The probability 150 can optionally be used by a separate alerting system, for example, configured by the user to provide an alert to system operators and/or monitors.

Figure 2:
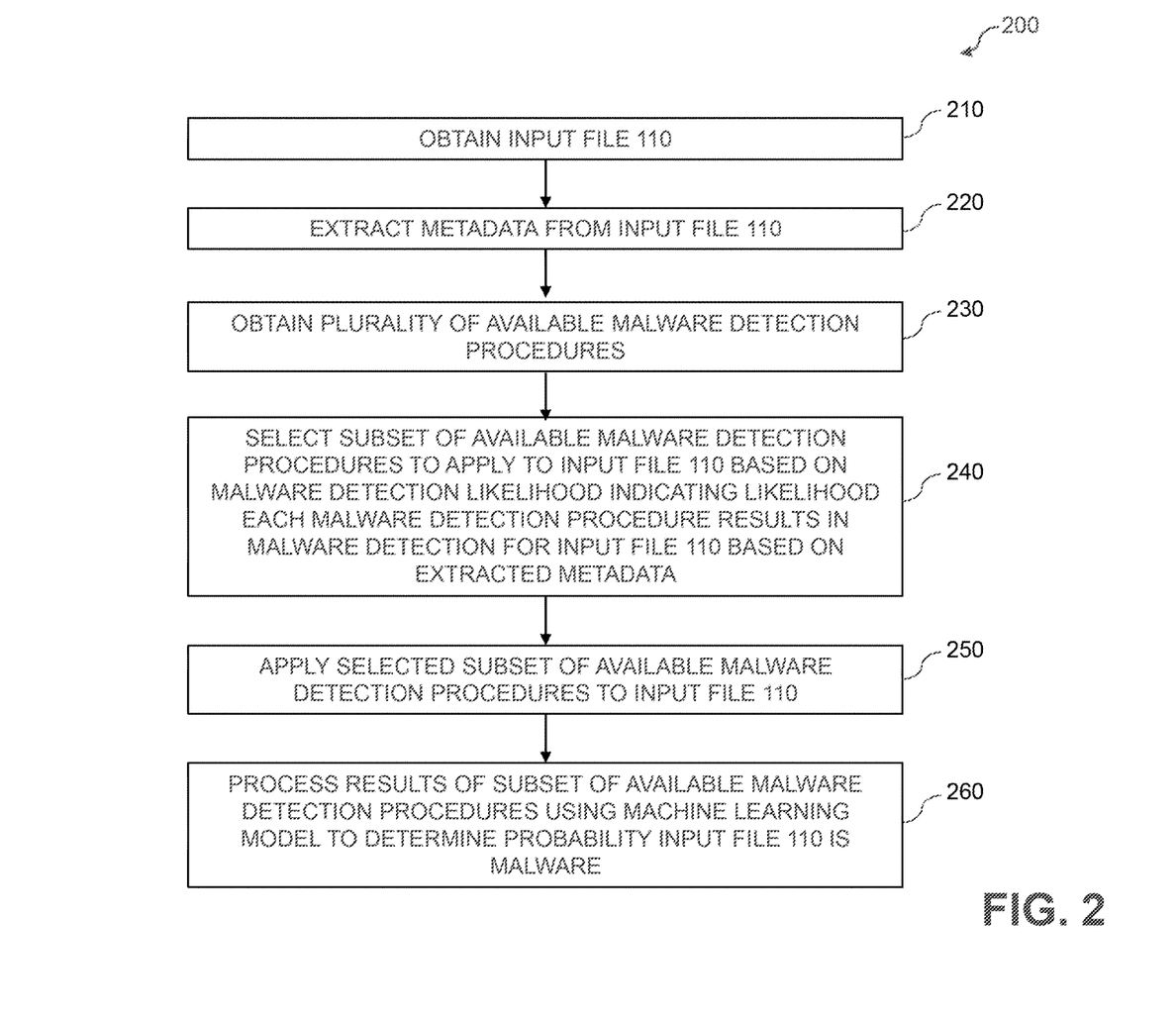
FIG. 2 is a flow chart illustrating an exemplary implementation of a data-driven ensemble-based malware detection process, according to some embodiments of the disclosure.

FIG. 2 is a flow chart illustrating an exemplary implementation of a data-driven ensemble-based malware detection process 200, according to some embodiments of the disclosure. As shown in FIG. 2, the exemplary data-driven ensemble-based malware detection process 200 initially obtains an input file 110 during step 210 and extracts metadata from the input file 110 during step 220.

Thereafter, the exemplary data-driven ensemble-based malware detection process 200 obtains a plurality of available malware detection procedures (e.g., from the malware detection procedures repository 130) during step 230.

A subset of the available malware detection procedures is selected during step 240 to apply to the input file 110 based on a malware detection likelihood indicating a likelihood that each malware detection procedure will result in a malware detection for input file 110 based on the extracted metadata. In some embodiments, the top N malware detection procedures or the malware detection procedures exceeding a predefined probability value are selected. The selected subset of malware detection procedures is applied to the input file 110 during step 250.

Finally, the exemplary data-driven ensemble-based malware detection process 200 processes the results of the subset of malware detection procedures during step 260 using a machine learning model to determine a probability that the input file 110 is malware. In this manner, the multiple results from the selected malware detection procedures are aggregated into a single result providing an overall probability that the input file 110 is malware (which may be expressed, for example, as a health score).

Figure 3:
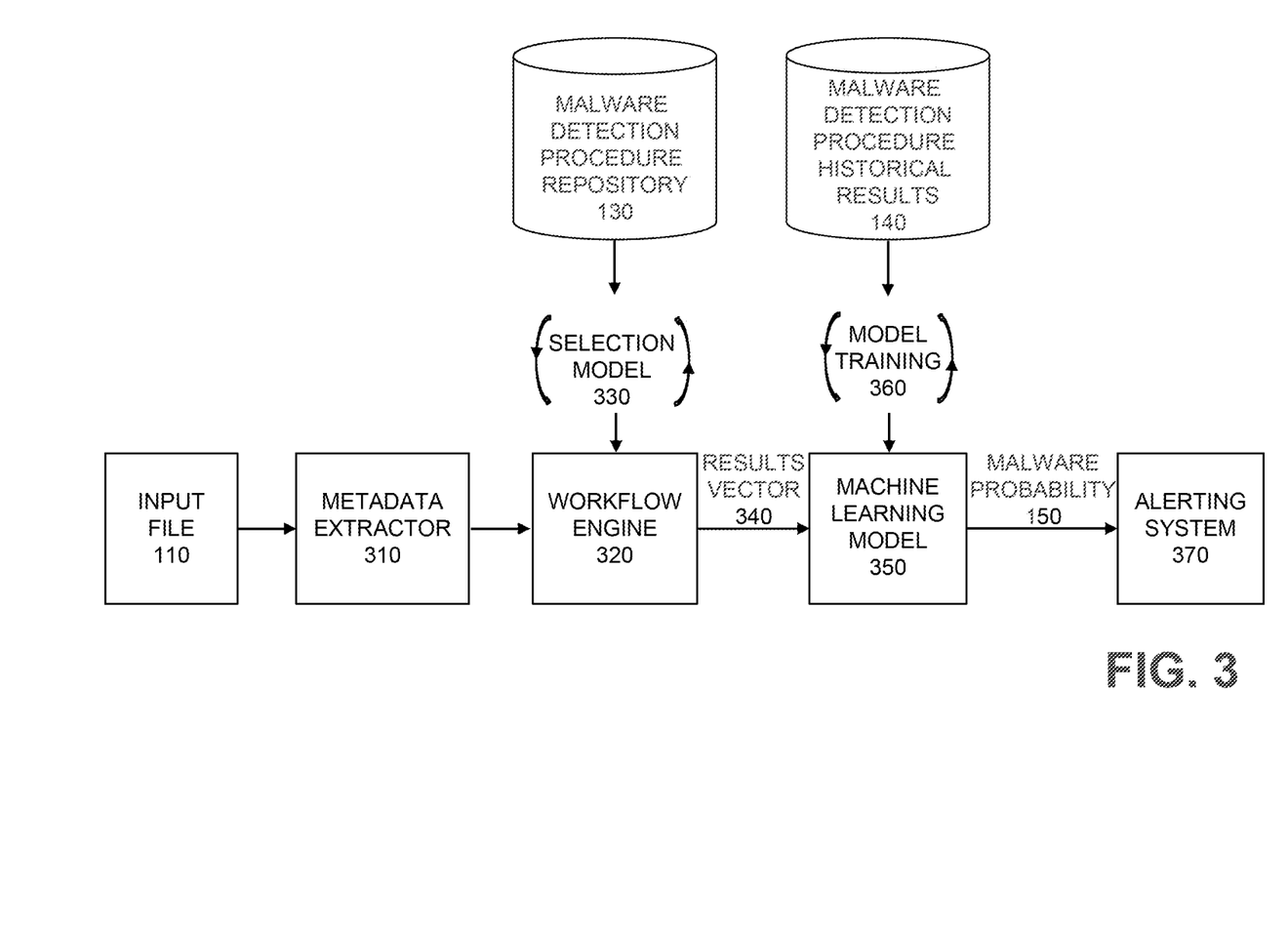
FIG. 3 illustrates the exemplary data-driven ensemble-based malware detector of FIG. 1 in further detail, according to one or more embodiments of the disclosure.

FIG. 3 illustrates the exemplary data-driven ensemble-based malware detector 100 of FIG. 1 in further detail, according to one or more embodiments of the disclosure. As noted above, the exemplary data-driven ensemble-based malware detector 100 and data-driven ensemble-based malware detection process 200 select an ensemble of malware detection procedures to apply to an input file 110 from among multiple available malware detection procedures in a repository 130, based on the probability that each available malware detection procedure will detect malware given characteristics of the input file 110 (e.g., metadata extracted from the input file 110). After running the selected malware detection procedures, the exemplary data-driven ensemble-based malware detector 100 applies a machine learning model to the results from the selected malware detection procedures to determine the probability 150 that the input file 110 is malicious.

In some embodiments, a given input file 110 is fetched into a queue of the data-driven ensemble-based malware detector 100 from an application programming interface or from an external storage device.

As shown in FIG. 3, a metadata extractor 310 extracts metadata from the input file 110, such as predefined metadata comprising, for example, a suffix, author, number of modifications and/or creation time, to characterize the input file 110.

A workflow engine 320 stores (or connects to) different selected malware detection procedures from the malware detection procedures repository 130, using a selection model 330. The workflow engine 320 uses the guidance of the selection model 330, discussed further below in conjunction with FIG. 4, to select the malware detection procedures that are most likely to result in a malware detection for the input file 110. Generally, in one or more embodiments, a Bayesian model (not shown in FIG. 3) is used to estimate the probability that a certain malware detection procedure would be able to detect a malware in the given input file 110.

In some embodiments, users are able to configure the workflow engine 320 with the following exemplary parameters: a maximum number of malware detection procedures that can be executed within the workflow for a given input file 110, a detection probability threshold, metadata features to be used when training the selection model 330, and logging properties.

As noted above, the selection model 330 filters the available malware detection procedures from the malware detection procedures repository 130 that are not likely to detect malware on a given input file 110 (based on, for example, the extracted metadata). For example, if a given malware detection procedure was applied numerous times to input files 110 having a PDF file type and never detected a virus, then, generally, the selection model 330 should not select the given malware detection procedure to execute on a new PDF file. In this manner, the execution of malware detection procedures that have never detected malware on this type of input file 110 is avoided.

Each selected malware detection procedure from the malware detection procedures repository 130 is executed within the workflow engine 320 and the outcomes of each selected malware detection procedure serve as the building blocks of a results vector 340 that is applied to a machine learning model 350.

In some embodiments, the exemplary machine learning model 350 processes the results vector 340 comprising the results from the selected malware detection procedures and provides a malware probability 150 (e.g., a health score) representing the probability that the input file 110 is malicious. The machine learning approach employed by the exemplary machine learning model 350 can also be referred to as a meta-learner. Generally, meta-learners are models that take results of other models as an input and model complex relationships that are hidden in the results. The output of these meta-learner models is a single number that determines whether the given instance is positive or negative (malware or benign in the present case).

In at least one embodiment, the meta-learner model used by the exemplary machine learning model 350 is a supervised model that is trained during a model training 360 using labeled instances. In order to address this need, the exemplary model training 360 processes historical executions of the malware detection procedures from the exemplary malware detection procedure historical results 140. The results of the historical executions of the malware detection procedures comprise ground truth that are used as labels for the exemplary model training 360. In other words, positive examples used by the model training 360 are files that appeared to be malicious and negative instances used by the model training 360 are files that appeared to be benign. This mechanism provides the capability to add new instances to the dataset whenever a new execution is applied and to keep the machine learning model 350 updated.

While the exemplary machine learning model 350 employs a meta-learner model, any type of supervised machine learning model can be employed, as would be apparent to a person of ordinary skill in the art. For example, in one alternate implementation, a most suitable model to be employed by the machine learning model 350 can be evaluated following a competition among different algorithms (for example, Support Vector Regression, Random Forest, Linear Regression and Neural Networks). The evaluation criteria for selecting the substantially best model can be an F1 score in some embodiments that gives substantially equal weight to Precision and Recall.

The malware probability 150 (e.g., a health score) representing the probability that the input file 110 is malicious is optionally used by a separate alerting system 370, for example, configured by the user.

Figure 4:
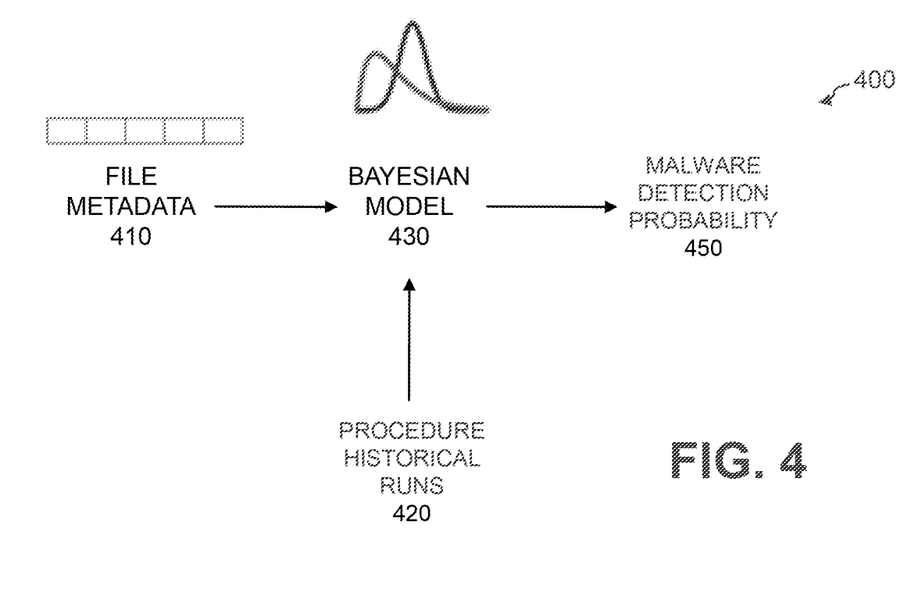
FIG. 4 illustrates a training process 400 for training the selection model 330 of FIG. 3, according to at least one embodiment.

FIG. 4 illustrates a training process 400 for training the selection model 330 of FIG. 3, according to at least one embodiment. As noted above, the workflow engine 320 uses the guidance of the selection model 330 to select the malware detection procedures that are most likely to result in a malware detection for the input file 110. In the exemplary embodiment of FIG. 4, a Bayesian model 430 is used to estimate the probability that a given malware detection procedure would be able to detect malware in the given input file 110.

For example, the Bayesian model 430 can process data comprising rows with procedure historical runs 420 of the given malware detection procedure and columns with file metadata 410 comprising characteristics of the files on which the given malware detection procedure was executed in the past. In some embodiments, a separate Bayesian model 430 is employed for each available malware detection procedure from the malware detection procedures repository 130. Thus, whenever a new input file 110 arrives, the characteristics of the new input file 110 enable the assessment of a malware detection probability 450 for each malware detection procedure. The overall malware detection probability 450 is optionally used as a prior probability (which is required for models as such), which can be updated towards a posterior probability as new files are tested by the respective malware detection procedure. The usage of prior probabilities enable cases of new procedures that have not been executed in the past to be addressed (e.g., one reason for using a Bayesian model for this task in the exemplary embodiment). As described above with respect to the workflow engine 320, the malware detection probability 450 of each malware detection procedure drives the decision of whether or not the respective malware detection procedure should be executed on a given input file 110. For example, assume that a user configures the number of malware detection procedures to be employed on a given input file 110 as 100. Thus, the top 100 malware detection procedures in terms of the malware detection probability 450 should be selected by the selection model 330 and executed by the workflow engine 320.

In some embodiments, the disclosed techniques for data-driven ensemble-based malware detection employ statistical methods capturing complex relationships among the available malware detection procedures and machine learning algorithms to improve the efficiency of the disclosed malware detection techniques and to reduce the usage of computational resources, as well as the number of associated false alarms (thereby increasing the overall detection rate for malware). The disclosed selective approach reduces the overall detection process, improves detection time and eventually frees computing resources to evaluate other files. In this manner, the efficiency of resource allocation and the efficiency of the cyber experts is improved.

Among other benefits, the employed machine learning algorithms are able to digest, process and model complex information towards a simple decision, given a sufficient amount of historical data. In addition, the use of machine learning algorithms enables the cyber experts to focus on other important tasks (for example, learning about recent trends and designing new malware detection tools).

One or more embodiments of the disclosure provide improved methods, apparatus and computer program products for data-driven ensemble-based malware detection. The foregoing applications and associated embodiments should be considered as illustrative only, and numerous other embodiments can be configured using the techniques disclosed herein, in a wide variety of different applications.

It should also be understood that the disclosed data-driven ensemble-based malware detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for data-driven ensemble-based malware detection may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the data-driven ensemble-based malware detector 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data-driven ensemble-based malware detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
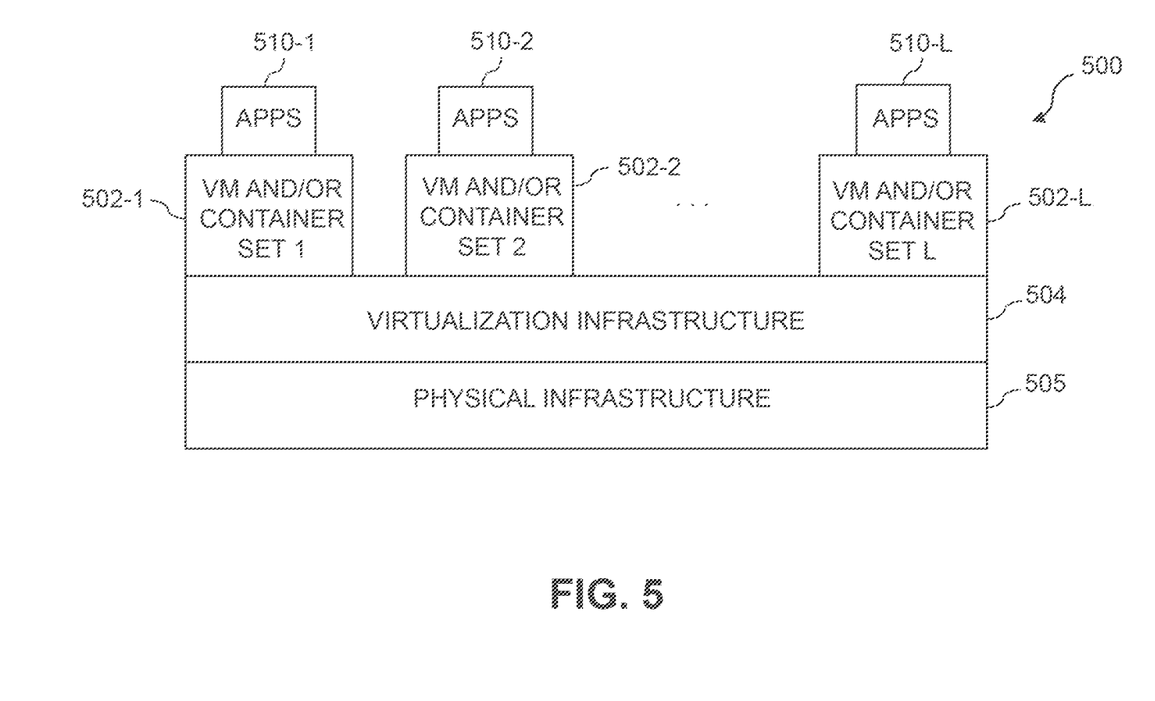
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the data-driven ensemble-based malware detector 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide data-driven ensemble-based malware detection functionality of the type described above for one or more processes running on a given one of the VMs. For example, each of the VMs can implement data-driven ensemble-based malware detection control logic for providing data-driven ensemble-based malware detection functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide data-driven ensemble-based malware detection functionality of the type described above for one or more processes running on different ones of the containers. For example, a container host device supporting multiple containers of one or more container sets can implement one or more instances of data-driven ensemble-based malware detection control logic for use in detecting malware in an input file 110.

As is apparent from the above, one or more of the processing modules or other components of the data-driven ensemble-based malware detector 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
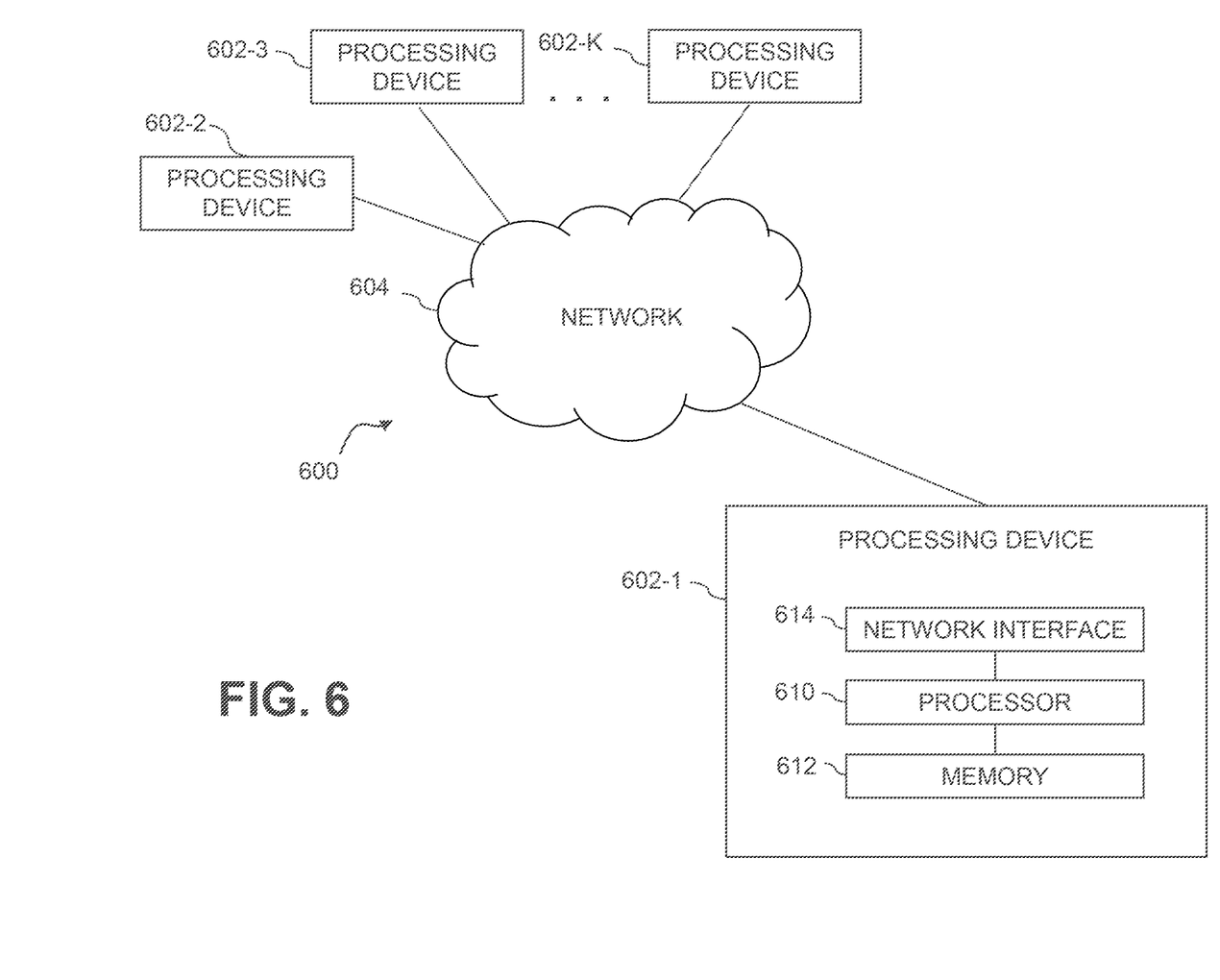
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a file;
extracting metadata from the file;
obtaining a plurality of malware detection procedures;
selecting, using at least one processing device, a subset of the plurality of malware detection procedures to apply to the file utilizing a likelihood that each of the plurality of malware detection procedures will result in a malware detection for the file based on the extracted metadata;
applying, using the at least one processing device, the selected subset of the malware detection procedures to the file; and
processing, using the at least one processing device, results of the subset of malware detection procedures using a machine learning model to determine a probability of the file being malware.

2. The method of claim 1, wherein the step of selecting the subset of the malware detection procedures to apply to the file employs a Bayesian model that determines a probability that a given malware detection procedure will detect malware in the given file based on one or more historical executions of the given malware detection procedure and characteristics of historical files on which the given malware detection procedure was previously executed.

3. The method of claim 2, further comprising the step of updating the Bayesian model as new files are tested by the given malware detection procedure.

4. The method of claim 2, further comprising the step of obtaining a configuration of one or more of a substantially maximum number of malware detection procedures to be executed for a given file, a detection probability threshold, and one or more metadata features to be used for training the Bayesian model.

5. The method of claim 1, wherein the step of processing the results of the subset of the malware detection procedures using the machine learning model employs a supervised machine learning model that processes the results of the subset of the malware detection procedures as an input and models relationships within the results to generate a health score indicating whether the file is malware.

6. The method of claim 5, wherein the supervised machine learning model is trained using a plurality of historical files classified as malware as positive examples and a plurality of historical files classified as non-malicious as negative examples.

7. The method of claim 1, further comprising the step of generating one or more alerts for a detected malware based on one or more of a user configuration, at least one predefined rule and a predefined policy.

8. A system, comprising:
a memory; and
at least one processing device, coupled to the memory, operative to implement the following steps:
obtaining a file;
extracting metadata from the file;
obtaining a plurality of malware detection procedures;
selecting a subset of the plurality of malware detection procedures to apply to the file utilizing a likelihood that each of the plurality of malware detection procedures will result in a malware detection for the file based on the extracted metadata;
applying the selected subset of the malware detection procedures to the file; and
processing results of the subset of malware detection procedures using a machine learning model to determine a probability of the file being malware.

9. The system of claim 8, wherein the step of selecting the subset of the malware detection procedures to apply to the file employs a Bayesian model that determines a probability that a given malware detection procedure will detect malware in the given file based on one or more historical executions of the given malware detection procedure and characteristics of historical files on which the given malware detection procedure was previously executed.

10. The system of claim 9, further comprising the steps of updating the Bayesian model as new files are tested by the given malware detection procedure and obtaining a configuration of one or more of a substantially maximum number of malware detection procedures to be executed for a given file, a detection probability threshold, and one or more metadata features to be used for training the Bayesian model.

11. The system of claim 8, wherein the step of processing the results of the subset of the malware detection procedures using the machine learning model employs a supervised machine learning model that processes the results of the subset of the malware detection procedures as an input and models relationships within the results to generate a health score indicating whether the file is malware.

12. The system of claim 11, wherein the supervised machine learning model is trained using a plurality of historical files classified as malware as positive examples and a plurality of historical files classified as non-malicious as negative examples.

13. The system of claim 8, further comprising the step of generating one or more alerts for a detected malware based on one or more of a user configuration, at least one predefined rule and a predefined policy.

14. A computer program product, comprising a non-transitory machine-readable storage medium having encoded therein executable code of one or more software programs, wherein the one or more software programs when executed by at least one processing device perform the following steps:
obtaining a file;
extracting metadata from the file;
obtaining a plurality of malware detection procedures;
selecting a subset of the plurality of malware detection procedures to apply to the file utilizing a likelihood that each of the plurality of malware detection procedures will result in a malware detection for the file based on the extracted metadata;

applying the selected subset of the malware detection procedures to the file; and processing results of the subset of malware detection procedures using a machine learning model to determine a probability of the file being malware.

15. The computer program product of claim 14, wherein the step of selecting the subset of the malware detection procedures to apply to the file employs a Bayesian model that determines a probability that a given malware detection procedure will detect malware in the given file based on one or more historical executions of the given malware detection procedure and characteristics of historical files on which the given malware detection procedure was previously executed.

16. The computer program product of claim 15, further comprising the step of updating the Bayesian model as new files are tested by the given malware detection procedure.

17. The computer program product of claim 15, further comprising the step of obtaining a configuration of one or more of a substantially maximum number of malware detection procedures to be executed for a given file, a detection probability threshold, and one or more metadata features to be used for training the Bayesian model.

18. The computer program product of claim 14, wherein the step of processing the results of the subset of the malware detection procedures using the machine learning model employs a supervised machine learning model that processes the results of the subset of the malware detection procedures as an input and models relationships within the results to generate a health score indicating whether the file is malware.

19. The computer program product of claim 18, wherein the supervised machine learning model is trained using a plurality of historical files classified as malware as positive examples and a plurality of historical files classified as non-malicious as negative examples.

20. The computer program product of claim 14, further comprising the step of generating one or more alerts for a detected malware based on one or more of a user configuration, at least one predefined rule and a predefined policy.

* * * * *